US007409879B2

(12) United States Patent
Glatz

(10) Patent No.: US 7,409,879 B2
(45) Date of Patent: Aug. 12, 2008

(54) CONSTRUCTION MACHINE COMPRISING A JOYSTICK CONTROL

(75) Inventor: Tobias Glatz, Memmingen-Steinheim (DE)

(73) Assignee: Liebher-Hydraulikbagger GmbH, Kirchdorf/Iller (DE)

( * ) Notice: Subject to any disclaimer, the term of this patent is extended or adjusted under 35 U.S.C. 154(b) by 75 days.

(21) Appl. No.: 11/449,525

(22) Filed: Jun. 8, 2006

(65) Prior Publication Data

US 2007/0062789 A1 Mar. 22, 2007

(30) Foreign Application Priority Data

Nov. 25, 2004 (DE) .................. 20 2004 018 299 U

(51) Int. Cl.
*G01L 1/00* (2006.01)

(52) U.S. Cl. ................................. 73/862.541; 180/333

(58) Field of Classification Search ............ 73/862.541; 180/333

See application file for complete search history.

(56) References Cited

U.S. PATENT DOCUMENTS

| | | | | |
|---|---|---|---|---|
| 4,680,577 | A * | 7/1987 | Straayer et al. | 345/160 |
| 5,086,870 | A * | 2/1992 | Bolduc | 180/333 |
| 5,335,743 | A * | 8/1994 | Gillbrand et al. | 180/178 |
| 5,541,622 | A * | 7/1996 | Engle et al. | 345/161 |
| 5,577,417 | A | 11/1996 | Fournier | |
| 5,640,178 | A | 6/1997 | Endo et al. | |
| 6,006,852 | A * | 12/1999 | Eckstein et al. | 180/333 |
| 6,152,239 | A * | 11/2000 | Kelley et al. | 172/4.5 |
| 6,693,624 | B1 * | 2/2004 | Niiyama | 345/161 |
| 7,176,891 | B2 * | 2/2007 | Inukai | 345/161 |
| 7,204,338 | B2 * | 4/2007 | Katae et al. | 180/315 |

FOREIGN PATENT DOCUMENTS

| | | |
|---|---|---|
| DE | 19961532 | 7/2000 |
| DE | 10111609 | 9/2002 |
| FR | 2780547 | 12/1999 |
| GB | 2314607 | 1/1998 |
| JP | 07-061354 | 3/1995 |
| JP | 10-91263 | 4/1998 |
| JP | 2000-204599 | 7/2000 |
| JP | 2004-278208 | 10/2004 |
| WO | 02/090668 | 11/2002 |

* cited by examiner

*Primary Examiner*—Edward Lefkowitz
*Assistant Examiner*—Freddie Kirkland, III
(74) *Attorney, Agent, or Firm*—Dilworth & Barrese, LLP

(57) ABSTRACT

The present invention relates to a construction machine such as an excavator, a crawler-type vehicle, a wheeled loader or the like, comprising at least one interchangeable equipment item which is actuable by means of an electronic control, wherein the control has a control handle, preferably movable through multiple axes, in particular a joystick, for the generation of control commands for the interchangeable equipment item, wherein at least one actuation element is arranged at the control handle whose actuation is sensed by means of a sensor device and is converted into a control signal. In accordance with the invention, the construction machine is characterized in that a dynamometer and/or torque meter is provided as the sensor device which is connected to the actuation element and senses actuation forces and/or actuation torques exerted onto the actuation element.

24 Claims, 2 Drawing Sheets

CONSTRUCTION MACHINE COMPRISING A JOYSTICK CONTROL

BACKGROUND OF THE INVENTION

The present invention relates to a construction machine such as an excavator, a crawler-type vehicle, a wheeled loader or the like, comprising at least one interchangeable equipment item which is actuable by means of an electronic control, wherein the control has a control handle, preferably movable through multiple axes, in particular a joystick, for the generation of control commands for the interchangeable equipment item, wherein at least one actuation element is arranged at the control handle whose actuation is sensed by means of a sensor device and is converted into a control signal.

With earthmovers such as excavators, crawler-type vehicles or wheeled loaders, operation facilitates the control of the interchangeable equipment items, which are often movable through multiple axes, by means of a joystick likewise movable through multiple axes. A movement of the joystick in different directions effects different movements of the interchangeable equipment item and/or of the construction machine itself. The movability of the joystick itself is, however, often not sufficient to give the control the plurality of required control commands. For this purpose, DE 20 2004 004 953 U1 proposes providing an additional actuation switch to the joystick in the form of a rotatable knurled wheel which can be actuated by a fingertip of a hand gripping around the joystick. The movement of the knurled wheel, expressed more precisely of a magnet fastened thereto, is sensed by means of a Hall sensor arranged in the joystick and is converted into corresponding control signals. The insufficient sensitivity of the actuation is, however, disadvantageous with this known control arrangement. The movement of the actuation switch and its sensing moreover requires a certain space which prevents a small constructional size of the joystick on the arrangement of a plurality of actuation switches.

SUMMARY OF THE INVENTION

It is therefore the underlying object of the present invention to provide an improved construction machine of the named type which avoids disadvantages of the prior art and further develops said prior art in an advantageous manner. A joystick control of sensitive operation and small constructional size should preferably be achieved.

This object is solved in accordance with the invention by a construction machine described herein. Preferred aspects of the present invention are also described herein.

In accordance with the invention, a force exerted onto the actuation element provided on the control handle or a torque exerted thereon is sensed as the actuation parameter. A dynamometer and/or a torque meter is provided as the sensor device and is connected to the actuation element and senses forces and/or torques exerted onto the actuation element by an operator. A very small construction size of the arrangement can be achieved by an electrical measurement of the mechanical parameter of force or torque since no larger travel distances of the actuation element are required. A movement sensing or travel distance sensing can be dispensed with.

The dynamometer and/or torque meter can generally have different designs. It preferably consists of at least one measuring cell which converts a force introduced into it into a corresponding electrical signal. Piezoelements could generally be used here. In accordance with a preferred embodiment of the invention, however, a measuring cell with strain gages is provided which is provided for the absorption of a force exerted onto the actuation element and/or of a torque induced by it.

In accordance with a first embodiment, the actuation element can be arranged fully immovably and can be connected substantially rigidly to the measuring cell. The force exerted onto the actuation element is introduced directly into the sensor. This arrangement is characterized by a minimal construction space and a minimal number of parts. It can be made completely free of mechanically movable parts.

In accordance with an alternative further development of the invention, the actuation element can also have a certain movability and be connected to the force sensor or the torque sensor via a spring. In this case, the force or the torque resulting therefrom is not introduced directly into the measuring cell but indirectly via the spring. The slight movement of the actuation element taking place on the actuation permits a better dosage and is perceived as more pleasant than a purely static introduction of force in an ergonomic respect. The actuation element can in particular be arranged laterally or transversely displaceable so that the respective finger can rest on an adjacent surface and can be pushed to and fro on the surface for actuation, which is felt to be particularly pleasant.

The measuring cell expediently senses the force introduced into it or the corresponding torque through multiple axes. Different control signals can hereby be generated in dependence on the direction and/or the magnitude of the actuation force, whereby a multidimensional control of the respective interchangeable equipment item is possible by only one actuation element. The corresponding attachment item can, for example, be moved backward and forward and to the left and right using the same actuation element.

In a further development of the invention, the actuation element is embedded into a wall of the joystick in a manner projecting slightly beyond it so that a tangential actuation of the actuation element, i.e. an actuation taking place in the surface, is possible, i.e. the actuation element can be pressed backward and forward to the side and to the left and right.

The position of the actuation element on the control handle can vary. In accordance with an advantageous embodiment of the invention, the actuation element is seated at the knob of the control handle to match the end of the thumb of a hand engaging around the control handle. It is, however, equally possible to arrange the actuation element to match another fingertip at the control handle.

Expediently, the measuring cell associated with the actuation element is arranged in the interior of the control handle so that it is protected, on the one hand, and is not in the way itself, on the other hand.

A plurality of actuation elements formed in the said manner can naturally also be provided. The electrical sensing of the mechanical parameter of force or torque permits a particularly small construction size of the arrangement so that an ergonomically favorable design of the control handle is always possible even with a plurality of actuation elements. Alternatively or additionally, the functional assignment of the actuation element can be varied, e.g. by means of a suitable switch, so that a preferably used function can be placed at the knob of the control handle in dependence on the attachment item.

BRIEF DESCRIPTION OF THE DRAWINGS

The invention will be explained in more detail in the following with respect to a preferred embodiment and to associated drawings. There are shown in the drawings.

DESCRIPTION OF THE PREFERRED EMBODIMENTS

Figure 1:
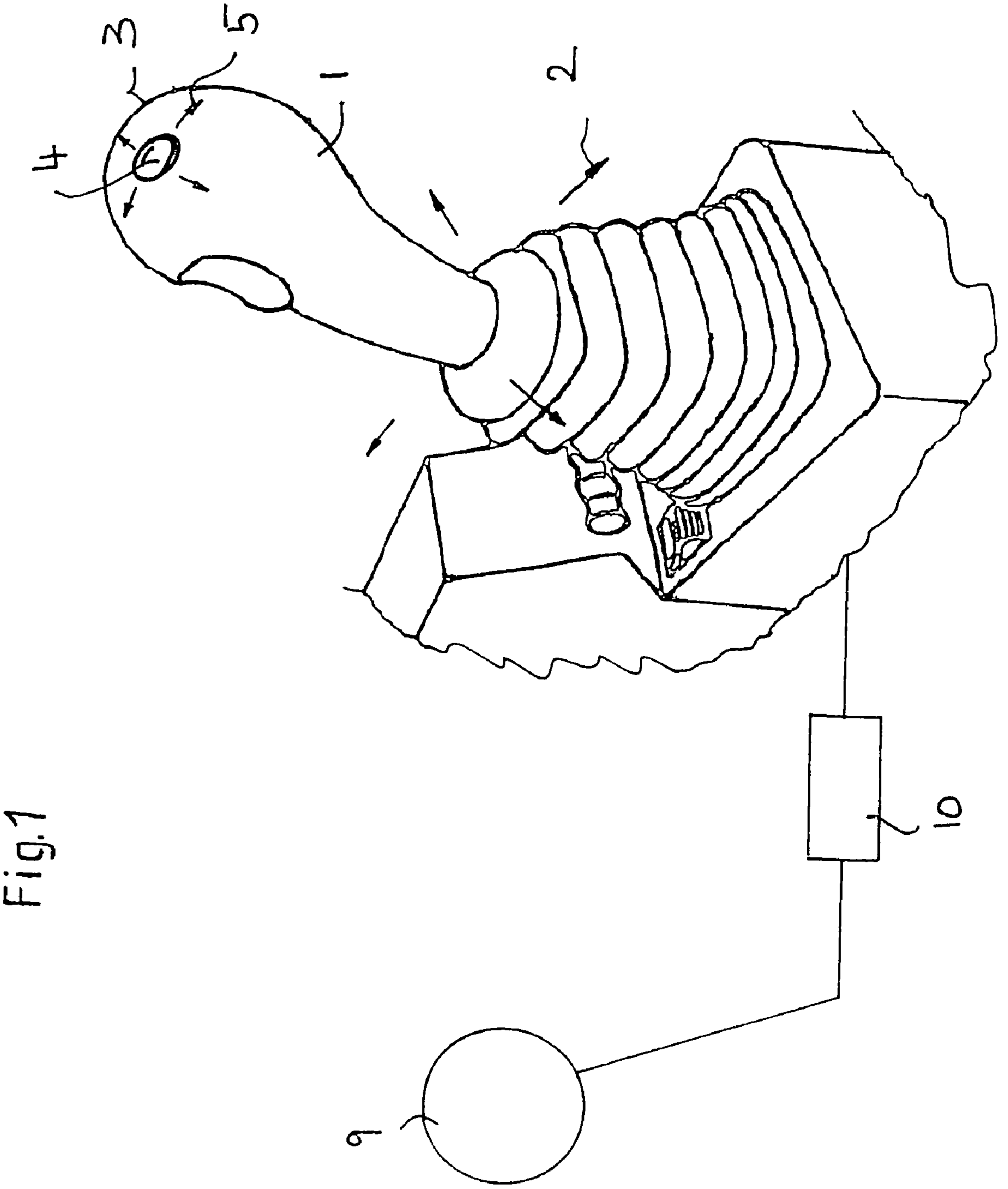
FIG. 1: a perspective view of a joystick movable through multiple axes for the control of an attachment item of a construction machine in a schematic representation, with a button-shaped actuation element for the control of additional functions of the attachment item and/or of the construction machine being able to be seen on the knob of the joystick.

The joystick 1 shown in FIG. 1 is arranged at a suitable position in the handle region of the machine operator of the respective construction machine. As the arrows 2 indicate, the joystick or control stick 1 is movable through multiple axes, in particular tiltable to the front and to the rear and to the left and to the right, whereby different functions of the construction machine or of an attachment item attached thereto can be controlled in a manner known per se.

In the drawn embodiment, an actuation element 4 is provided at the knob or head section 3 in the form of a button which is seated in a corresponding recess in the wall of the joystick 1 and projects slightly beyond it so that the actuation element can be actuated by a finger lying on the joystick 1. In the embodiment drawn in FIG. 1, the actuation element 4 is arranged such that the end of the thumb of the hand gripping the joystick 1 comes to lie on the actuation element 4.

As the arrows 5 indicate, the actuation element 4 is provided to be pressed to the side, i.e. in the plane of the joystick surface surrounding the actuation element 4 or tangentially thereto.

Figure 2:
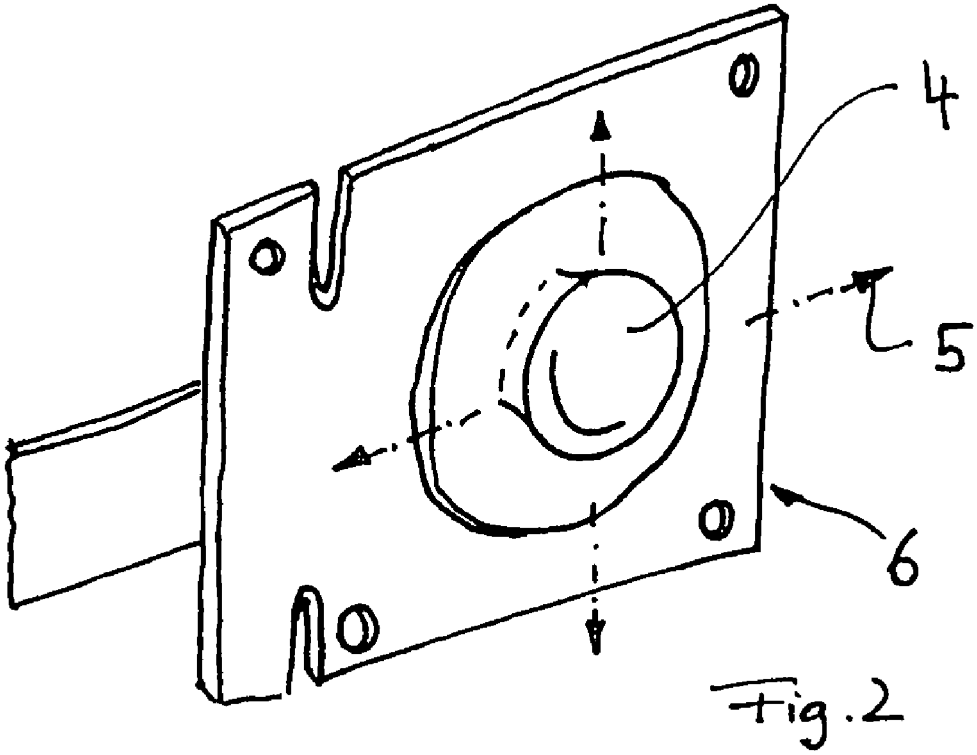
FIG. 2 a plan view of the button-shaped actuation element and the measuring cell connected to it for the sensing of an actuation of the actuation element.
Figure 3:
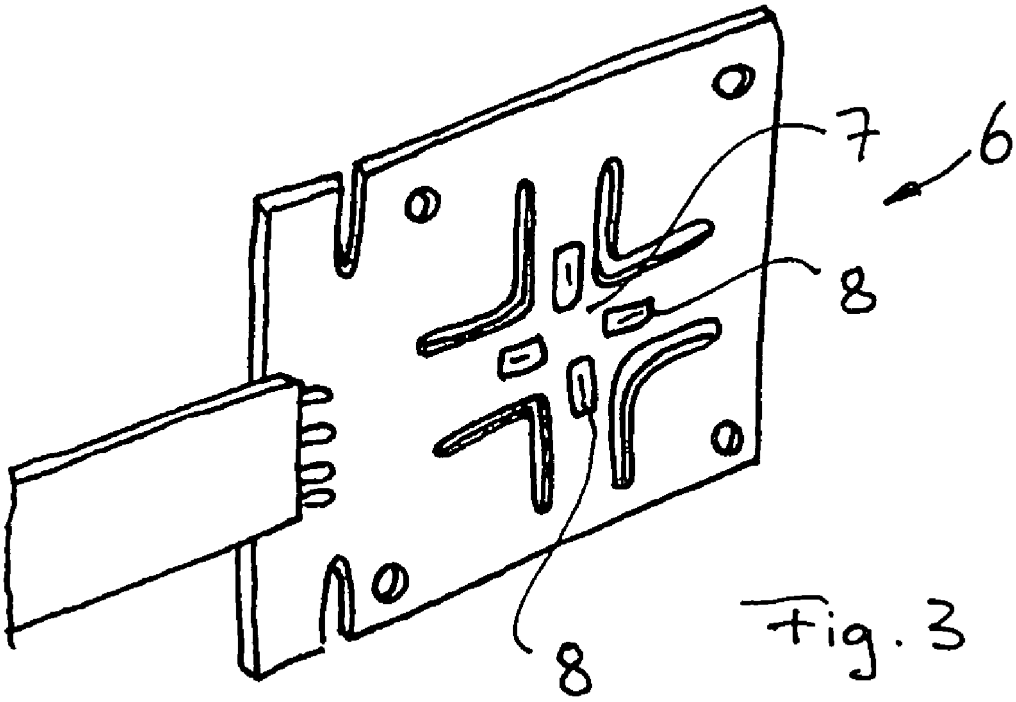
FIG. 3: a plan view of the lower side of the measuring cell of FIG. 2 which shows the arrangement of the strain gages of the measuring cell.

As FIG. 2 shows, the actuation element 4 is connected to a measuring cell 6 arranged at the interior of the joystick 1, said measuring cell sensing an actuation force acting in each case on the actuation element 4 or an actuation torque resulting from it. The measuring cell 6 is made as a strain gage measuring cell. As FIG. 3 shows, a plurality of sensor elements 8 are arranged on a measuring cell section 7 which is essentially cruciform due to corresponding cut-outs and sense, over multiple axes, a deformation of the measuring cell section 7 induced by the actuation forces and convert it into a corresponding measurement signal.

In the embodiment shown in FIG. 2, the actuation element 4 is directly connected to the measuring cell section 7 of the measuring cell 6. Alternatively to this, provision can advantageously be made to introduce the actuation forces into the measuring cell section 7 via a spring. The spring, not shown separately in the drawings, permits a certain movement of the actuation element 4 at the knob of the joystick 1, which is perceived as particularly pleasant and permits an even more sensitive dosing.

The invention claimed is:

1. A construction machine such as an excavator, a crawler-type vehicle, a wheeled loader or the like, comprising at least one interchangeable equipment (9) item which is actuable by of an electronic control (10), wherein the control (10) has a joystick control handle (1), movable through multiple axes for the generation of control commands for the interchangeable equipment item (9), at least one actuation element (4) is arranged at the control handle (1) whose actuation is sensed by a sensor device (6) and is converted into a control signal, and a dynamometer and/or torque meter (6) is provided as the sensor device which is connected to the actuation element (4) and senses actuation forces and/or actuation torques exerted onto the actuation element, wherein the joystick control handle (1) is tiltably movable forward and backward and from side to side for controlling different functions of the construction machine, and wherein the at least one actuation element (4) has an upper surface and is responsive to pressure applied forward, backward, and from side to side on the upper surface.

2. A construction machine in accordance with claim 1, wherein the dynamometer and/or torque meter is composed of at least one measuring cell, in particular a strain gage measuring cell (6).

3. A construction machine in accordance with claim 1, wherein the actuation element (4) is arranged substantially immovably and rigidly connected to the dynamometer and/or the torque meter (16).

4. A construction machine in accordance with claim 1, wherein the actuation element (4) is arranged movably, in particular transversely displaceably, and connected to the dynamometer and/or torque meter (6) via a spring.

5. A construction machine in accordance with claim 1, wherein the dynamometer and/or torque meter (6) is made for a multiaxial sensing of force and/or torque.

6. A construction machine in accordance with claim 1, wherein the dynamometer and/or torque meter (6) is made such that different control signals are generated in dependence on the direction and/or the magnitude of the actuation forces exerted onto the actuation element.

7. A construction machine in accordance with claim 1, wherein the actuation element (4) and/or the sensor device (6) are made such that an actuation substantially along a control handle surface surrounding the actuation element (4) is converted into corresponding control signals.

8. A construction machine in accordance with claim 1, wherein the actuation element (4) is arranged in the region of a head section (3) of the control handle (1) to match the thumb of a hand engaging around the control handle (1).

9. A construction machine in accordance with claim 1, wherein both the actuation element (4) and the dynamometer and/or torque meter (6) are integrated in the control handle (1).

10. A construction machine in accordance with claim 2, wherein the actuation element (4) is arranged substantially immovably and rigidly connected to the dynamometer and/or the torque meter (6).

11. A construction machine in accordance with claim 2, wherein the actuation element (4) is arranged movably, in particular transversely displaceably, and connected to the dynamometer and/or torque meter (6) via a spring.

12. A construction machine in accordance with claim 11, wherein the actuation element (4) is arranged in the region of a head section (3) of the control handle (1) to match the thumb of a hand engaging around the control handle (1).

13. A construction machine in accordance with claim 10, wherein the actuation element (4) is arranged in the region of a head section (3) of the control handle (1) to match the thumb of a hand engaging around the control handle.

14. A construction machine in accordance with claim 7, wherein the actuation element (4) is arranged in the region of a head section (3) of the control handle (1) to match the thumb of a hand engaging around the control handle (1).

15. A construction machine in accordance with claim 3, wherein the actuation element (4) is arranged in the region of a head section (3) of the control handle (1) to match the thumb of a hand engaging around the control handle.

16. A construction machine in accordance with claim 4, wherein the actuation element (4) is arranged in the region of a head section of the control handle (1) to match the thumb of a hand engaging around the control handle (1).

17. A construction machine in accordance with claim 16, wherein both the actuation element (4) and the dynamometer and/or torque meter (6) are integrated in the control handle (1).

18. A construction machine in accordance with claim 13, wherein both the actuation element (4) and the dynamometer and/or torque meter (6) are integrated in the control handle (1).

19. A construction machine in accordance with claim 15, wherein both the actuation element (4) and the dynamometer and/or torque meter (6) are integrated in the control handle (1).

20. A construction machine in accordance with claim 14, wherein both the actuation element (4) and the dynamometer and/or torque meter (6) are integrated in the control handle (1).

21. The construction machine of claim 1 wherein the actuation element (4) is positioned on a top surface of the joystick and the upper surface of the actuation element is parallel to the top surface of the joystick control handle (1).

22. The construction machine of claim 1 wherein the sensor device (6) includes a planar cell section (7) and a plurality of sensor elements (8) mounted in coplanar arrangement to cell section (7).

23. The construction machine of claim 22 wherein the cell section (7) is in a cruciform shape.

24. The construction machine of claim 23 wherein the cruciform shape is formed by cutouts.

* * * * *